Patented Dec. 4, 1923.

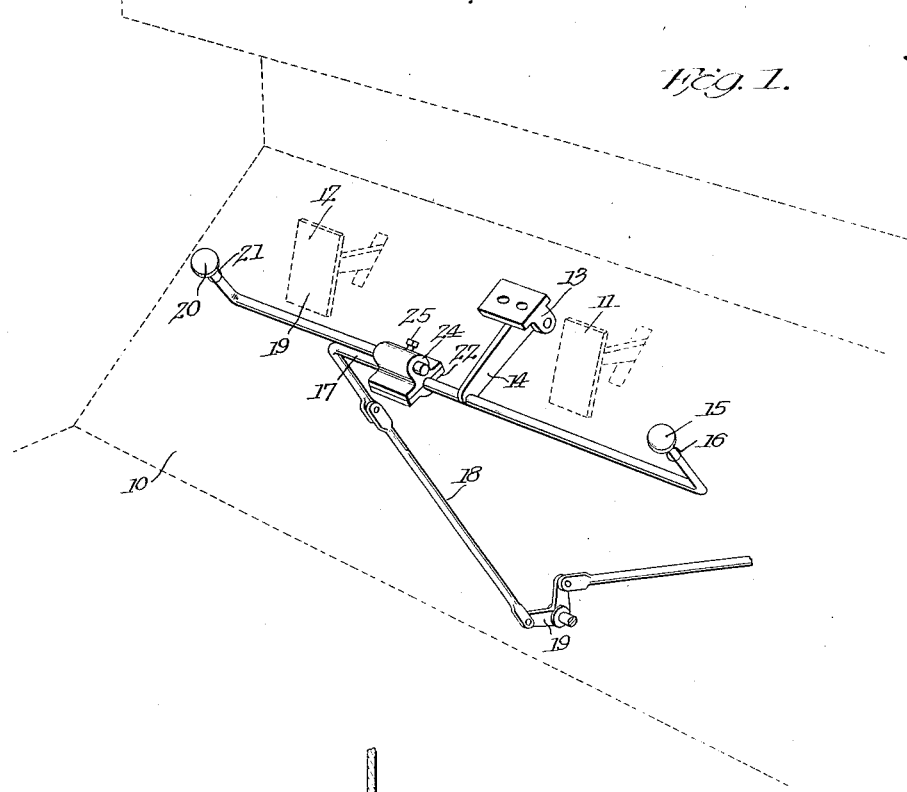

1,476,399

UNITED STATES PATENT OFFICE.

FRANK T. FRIDRICH, OF NORTH BEND, NEBRASKA.

AUXILIARY ACCELERATOR.

Original application filed September 9, 1922, Serial No. 587,087. Divided and this application filed August 11, 1923. Serial No. 656,915.

*To all whom it may concern:*

Be it known that I, FRANK T. FRIDRICH, a citizen of the United States, residing at North Bend, in the county of Dodge and State of Nebraska, have invented new and useful Improvements in Auxiliary Accelerators, of which the following is a specification.

This invention relates to control devices for motor vehicles, and more particularly to an attachment adapted to permit the driver of the vehicle to control the speed of the motor by using either foot.

The present application is a division of my pending application filed September 9, 1922, Serial No. 587,087, covering an auxiliary accelerator.

In the use of motor vehicles, particularly on long trips, the foot which operates the accelerator becomes cramped, and it is customary for the driver to use the hand throttle, although, were it not for the so called "driver's cramp," the operator would prefer to control the speed of the motor by means of the foot. This is much more convenient, for the reason that it leaves both hands free to control the spark lever and steering mechanism, and, additionally, because the foot accelerator automatically throttles down the motor when pressure thereupon is relieved.

It is an object of the present invention to provide an additional foot operable means for controlling gas supply, such means being located upon the same side of the center of the car as the usual accelerator, but laterally spaced from such accelerator, whereby the driver may use either foot for controlling the speed of the motor.

A further object of the invention is to provide means of the character above mentioned which may be readily attached to practically any vehicle.

The above and other objects of the invention may be accomplished by devices which vary considerably in their specific form, although, preferably, the invention takes the form of a readily attachable mechanism which may be operated by the left foot, when, as is customary, the accelerator pedal of the vehicle is operable by the right foot.

In the accompanying drawings, there is shown one embodiment of the invention, and in these drawings:—

Fig. 1 is a perspective view.

Fig. 2 is a side elevational view with the foot board of the vehicle shown in action.

Referring to the drawings, 10 indicates diagrammatically the foot board of the vehicle having the usual brake and clutch pedals indicated respectively at 11, 12. Beneath the foot board is positioned a bracket 13 carrying a lever 14, to which is secured the accelerator pedal 15, extending upwardly through an opening 16 in the foot board. The pedal has an extension 17 which is connected to a link 18 adapted to operate a bell crank 19, through which the accelerator pedal controls the gas supply valve of the carbureter (not shown).

Ordinarily, the accelerator pedal 15 is positioned in front of the driver's seat, so that it may be conveniently operated by the right foot of the driver. The additional means for controlling the gas supply should be placed in convenient position for the driver's left foot, and such a position, for instance, may be on the opposite side of the clutch pedal 12, from the customary accelerator pedal 15.

In the present instance, the additional accelerator pedal comprises an arm 19 which is on any suitable part of the accelerator mechanism; as shown, it is secured to the pedal extension 17, and has a pedal portion 20 extending upwardly through an opening 21 in the foot board. This arm is, preferably, an attachment for the ordinary accelerator mechanism, to which it may be readily secured. In the present instance, as will be noted, it is attached by means of a two-part clamp 22, having bolts 23 which securely position the clamp upon the extension 17. One of the halves of the clamp has an eye 24 which receives the end of the arm 19, the latter being longitudinally adjustable therein so that the pedal 20 may be adjusted transversely of the vehicle. A set screw 25 serves to retain the arm in adjusted position.

It will be noted that the additional pedal may be adjusted in the clamp eye 24 toward and from the pedal 15, so that the operator of the vehicle may position the same relative to the clutch and brake mechanisms, and the ordinary accelerator, as is most convenient for him.

It will be observed that the attachment may be readily applied to any type of vehicle having an accelerator mechanism to which the clamp may be secured, although, preferably, the clamp is attached, as indicated, directly to the ordinary right foot accelerator pedal.

It should be understood that such modifications may be made in the structure illustrated and described as come within the scope of the following claims.

I claim:—

1. In an automobile having the usual foot board and pedal mechanism for operating the clutch and brakes, the combination with the usual accelerator mechanism including a pedal mounted beneath the foot board and extending therethrough, of an additional arm connected to said pedal and extending transversely of the car, said arm having a pedal portion positioned above the foot board on the same side of the longitudinal center of the car with the driver's seat and spaced laterally from said accelerator pedal, whereby either foot of the driver may be used to control the gas supply, said pedal portion of the arm being adjustable transversely of the automobile.

2. In an automobile having the usual foot board and pedal mechanism for operating the clutch and brakes, the combination with the usual accelerator mechanism including a pedal mounted beneath the foot board and extending therethrough, of an additional arm connected to said pedal and extending transversely of the car, said arm having a pedal portion positioned above the foot board on the same side of the longitudinal center of the car with the driver's seat and spaced laterally from said accelerator pedal, whereby either foot of the driver may be used to control the gas supply, and means for clamping said arm to the pedal adapted to permit adjustment of the arm transversely of the automobile.

3. In an automobile having the usual foot board and pedal mechanism for operating the clutch and brakes, the combination with an accelerator mechanism including a lever pivotally mounted beneath the foot board and having a pedal portion extending therethrough, of additional means for controlling the gas supply comprising an arm secured to said lever beneath the foot board and extending transversely of the car, said arm having a pedal portion positioned above the foot board on the same side of the longitudinal center of the car with the driver's seat and spaced laterally from said accelerator pedal, whereby either foot of the driver may be used to control the gas supply.

In testimony whereof I have hereunto set my hand.

FRANK T. FRIDRICH.